Jan. 26, 1937.  R. S. WALKER  2,068,882
METHOD AND APPARATUS FOR TREATING ALKALI EARTH CARBONATE MATERIALS
Filed Dec. 22, 1934  2 Sheets-Sheet 1
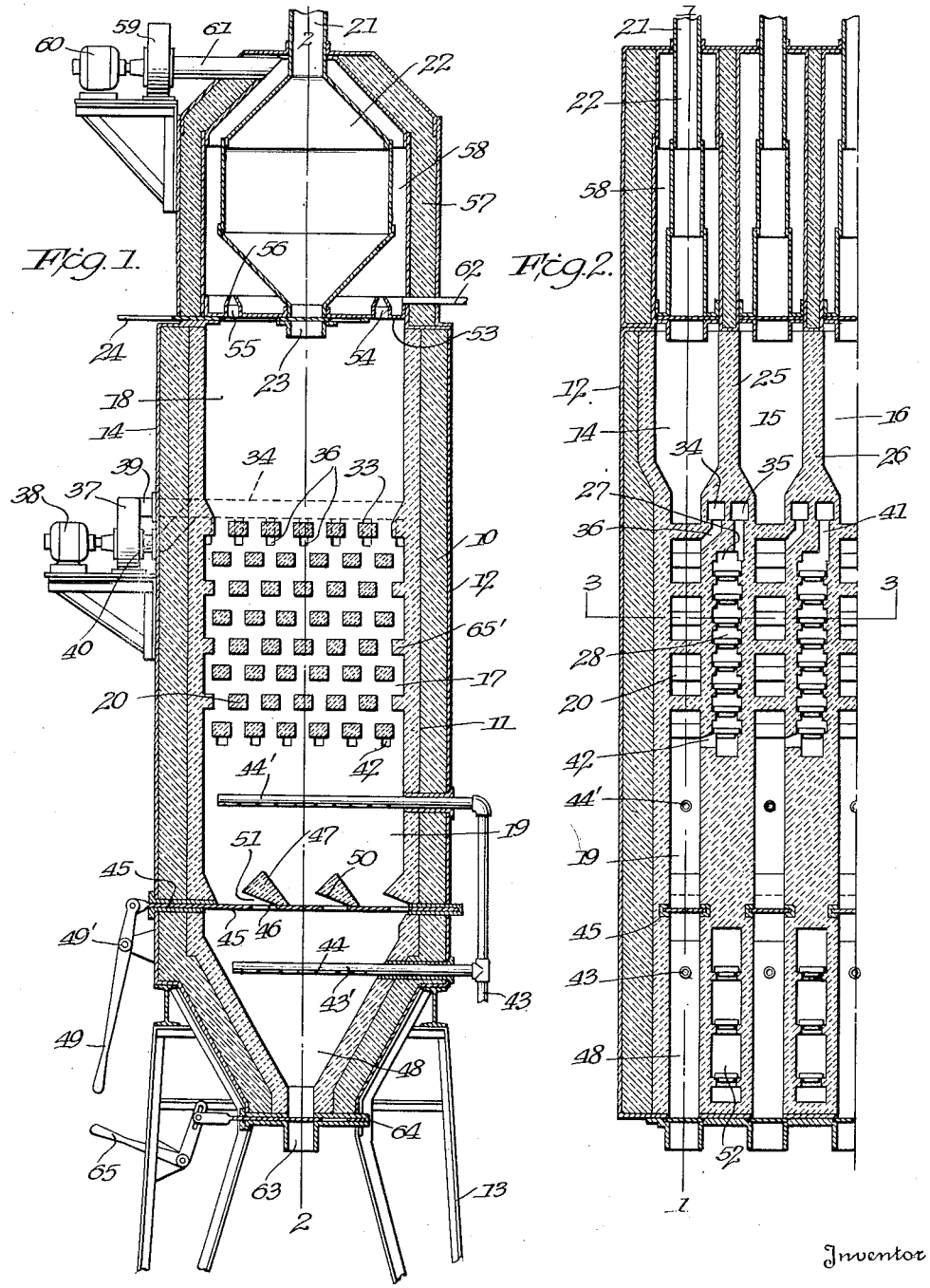
Inventor
Robert S. Walker Jan. 26, 1937.    R. S. WALKER    2,068,882
METHOD AND APPARATUS FOR TREATING ALKALI EARTH CARBONATE MATERIALS
Filed Dec. 22, 1934    2 Sheets-Sheet 2
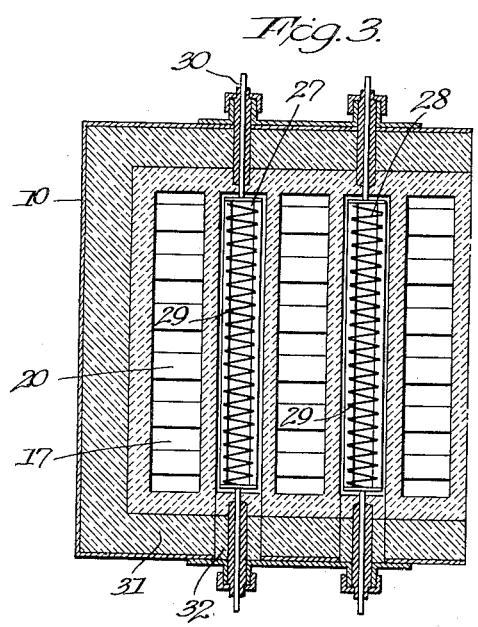
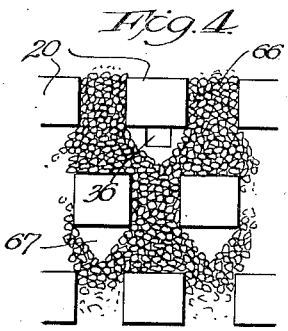
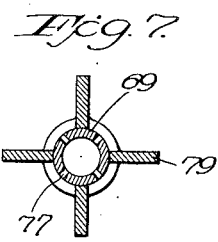
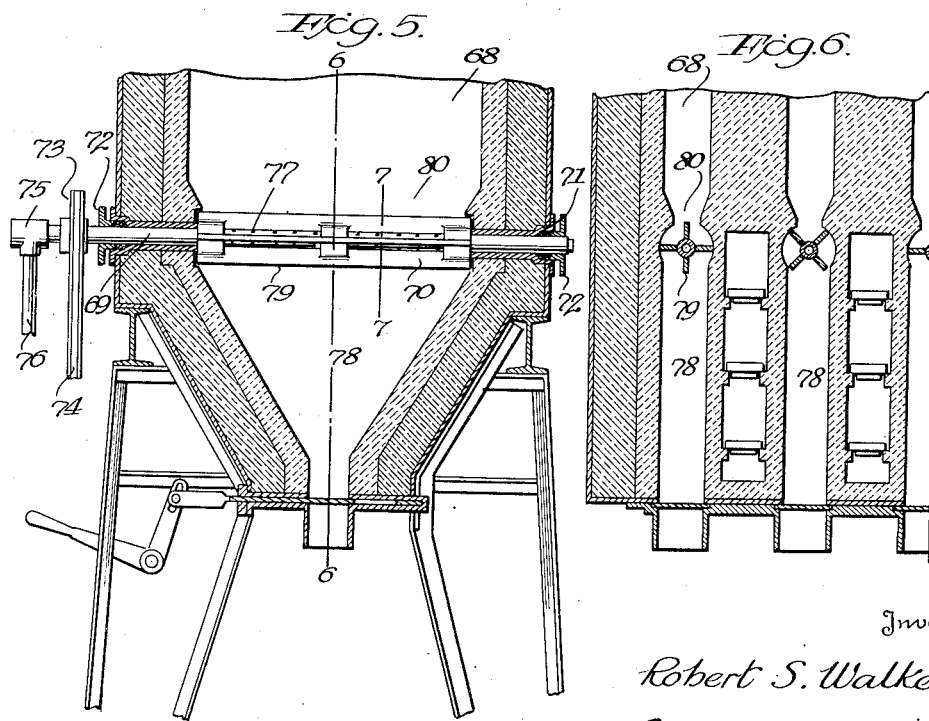
Inventor
Robert S. Walker.
By Cushman Darby & Cushman
Attorneys Patented Jan. 26, 1937

2,068,882

UNITED STATES PATENT OFFICE 2,068,882

METHOD AND APPARATUS FOR TREATING ALKALI-EARTH CARBONATE MATERIALS

Robert S. Walker, Bellefonte, Pa., assignor to Electro Lime & Ice Corporation, Wilmington, Del., a corporation of Delaware Application December 22, 1934, Serial No. 758,831

11 Claims. (Cl. 263—53)

The present invention relates to a new and improved method and apparatus for treating alkali-earth carbonate material and, more particularly, is an improvement upon the method and apparatus disclosed in my copending applications, Serial No. 553,583, Method for treating limestone, filed July 28, 1931; Serial No. 691,898, Apparatus for treating limestone, filed October 2, 1933, and Serial No. 752,174, Method and apparatus for treating carbonaceous material, filed November 8, 1934.

In my earlier application, Serial No. 752,174, filed November 8, 1934, which is directed to a method and apparatus for treating carbonaceous material, the charge is caused to flow or gravitate in a thin stream or streams through a closed calcining chamber, and at the same time is directly subjected to heat in an atmosphere inert to the gas and at a sufficiently high temperature to effect rapid calcination of the material. A portion of the gas evolved during calcination is withdrawn in pure condition from the calcining chamber and is conducted through an electrically heated passage inert with respect to the gas, and then returned to the calcining chamber in a direction counter to the flow of the material, to constitute heat circulating means for treating the material. To overcome the tendency of the evolved gas from clinging to the charge, a substantial portion of the calcining chamber is maintained in a condition, as by producing a sub-atmospheric pressure, which acts to thin out or lessen the density of the circulating gas and thereby facilitate the liberation of the occluded gas from the material. When a sub-atmospheric pressure is employed for this purpose, it is difficult to exclude air from the calcining chamber or soaking pit; moreover, in an atmosphere of substantially pure $CO_2$ at a temperature below 1600° F., the lime will recarbonate. Consequently, it is desirable, in order to avoid the absorption of the gas by the lime, to either discharge the lime above 1600° F. or reduce the partial pressure of the carbon dioxide gas as by a sub-atmospheric pressure or as I now disclose, by the admission of a gaseous fluid, such as steam, which is readily separable from the carbon dioxide.

I have found that, instead of maintaining a sub-atmospheric pressure in the calcining chamber, the desired results may be economically effected by introducing a heated gaseous fluid, such as steam or other suitable gas or fluid, into the calcining chamber to produce a condition which reduces the partial pressure of the circulating gas so as to facilitate the liberation of the evolved gas from the material. I also find it desirable to provide such an atmosphere below the calcining zone to prevent recarbonization of the calcined material, should the temperature drop below 1600° F.

The steam is introduced under constant pressure into the apparatus, preferably at a temperature above 900° F., to provide an atmosphere of dry steam and, as the steam passes upwardly through the calcined lime, it will cool the lime and, in turn, the lime will heat the steam so that there will be no actual loss in temperature in the calcining zone. Moreover, the heat of the lime which has been calcined will not be dissipated, but will be reclaimed to raise the temperature of the steam. The pressure of the dry steam in the soaking pit acts to force the carbon dioxide upwardly into the calcining or reducing chamber so that the atmosphere of the soaking pit will be that of dry steam mixed with carbon dioxide. This dilution of the carbon dioxide rarifies the same or reduces its density, thereby reducing the partial pressure and having the effect of a partial vacuum in the calcining chamber. As the temperature of the steam is above 900° F., the lime in the soaking pit will neither recarbonate nor hydrate. Since the steam is constantly admitted into the apparatus, it will maintain an atmosphere of dry steam at all points in the apparatus at which the lime falls below a temperature of 1600° F., thus providing means for avoiding recarbonization of the lime and also means for preventing hydration or the forming of hydroxide by the combining of the lime with the steam.

In my improved method and apparatus, I utilize certain of the important features of my earlier processes, namely (a) the electrical heating means, (b) the treating of the material in a stream or streams in a closed chamber, (c) an atmosphere inert to the gas, and (d) applying heat to the material from an electrical heating medium by employing the circulating gas as a heat conducting agent. Instead of utilizing a sub-atmospheric pressure as the means to reduce the partial pressure of the carbon dioxide on the limestone, I provide means for reducing the partial pressure by injecting a gaseous fluid such as steam or other suitable gas into the apparatus at a temperature above 900° F., which creates an atmosphere of dry steam in a portion of the apparatus and also acts to facilitate the liberation of the evolved gas in substantially the same manner as is effected by maintaining a sub-atmospheric pressure in the reducing chamber. That is to say, the steam rarifies or reduces the density of the gas around the particles of limestone.

An important advantage of utilizing steam for reducing the partial pressure is that the steam readily condenses and is easily removed from the carbon dioxide, leaving the carbon dioxide gas in pure form. When the steam condenses, it will carry with it any hydrogen sulphide which may be formed during calcination. The steam will also carry with it, any fine dust which may be produced by the lime and picked up by the removed and circulating gas. Consequently, the calcining chamber is maintained in an inert atmosphere and the evolved gas is withdrawn or recovered in substantially pure form.

One of the important features of the invention is to provide a simple, efficient and economical method and apparatus for treating carbonaceous material in which means are provided for maintaining an atmosphere of dry steam below the calcining zone or reducing chamber so as to prevent the treated material or calcined lime from recarbonating due to the lowering of its temperature.

A further object comprehends the provision of means for reducing the partial pressure of the gas in the calcining chamber so as to create the effect of a partial vacuum in order to prevent the evolved gas from clinging to the material and thus facilitate the rapid liberation of the gas during calcination.

A further feature of the invention is to provide a method and apparatus for treating carbonaceous material in which a portion of the gas evolved during calcination is mixed with dry steam and the mixture withdrawn from the calcining chamber, electrically heated and returned to the calcining chamber to constitute heat circulating means for effecting rapid calcination of the material.

Another object of the invention consists in passing the dry steam through the calcining chamber to contact with the calcined lime, thus utilizing the heat of the lime to superheat the steam while the steam in turn acts to cool the lime without reducing the temperature in the calcining chamber below that required to effect rapid calcination of the charge.

A further object of the invention consists in maintaining an atmosphere of dry steam in all parts of the apparatus at which the temperature of the treated material or lime falls below 1600° F. so as to avoid recarbonization and hydration of the material prior to its removal from the apparatus.

Another object consists in maintaining the soaking pit of the apparatus in an atmosphere of dry steam, i. e., at a temperature of above 900° F. to prevent the lime combining with the steam to form hydroxide.

Other objects and advantages of the invention will become apparent from the following description when taken in conjunction with the following claims and drawings:—

Referring to the drawings in which are shown several preferred forms of apparatus for carrying out my method, Figure 1 is a sectional view taken along the line 1—1 of Figure 2;

Figure 2 is a sectional view taken substantially along the line 2—2 of Figure 1;

Figure 3 is an enlarged sectional view taken substantially along the line 3—3 of Figure 2;

Figure 4 is an enlarged fragmentary view of the interrupting means;

Figure 5 is a detailed sectional view of a modified form of the apparatus;

Figure 6 is a sectional view taken substantially along the line 6—6 of Figure 5; and Figure 7 is an enlarged sectional view taken substantially along the line 7—7 of Figure 5.

The apparatus for carrying out my method may assume various forms and as shown, comprises a unitary kiln or closed shaft furnace preferably formed of sections that may be added to or removed from the apparatus in order that batches of material of varying quantity or size may be simultaneously and separately treated at the same or at different times as conditions may warrant. Each unit of the furnace includes an outer wall 10 of suitable heat resisting material and an inner brick wall or lining 11 of refractory material which has a high thermal conductivity such as fire brick or the like. The apparatus is enclosed within a steel casing or jacket 12 and may be supported in any suitable manner such as by the frame or uprights 13.

For the purpose of illustrating the arrangement of the units constituting the apparatus, I have shown three of such units 14, 15 and 16. It will be understood, of course, that one or more of these units may be employed to form either a single furnace or a battery for simultaneously treating the material in separate batches. As the units are identical, the construction and operation of only one will be described.

The vertical passage constituting the interior of each furnace is divided into a calcining or reducing chamber 17 (Figure 1), a preheating chamber 18 and a soaking pit 19. The material is preheated in the chamber 18 and then is introduced into the calcining chamber 17 from where it is discharged into the soaking pit 19. To insure thorough calcination of the material as it gravitates through the calcining chamber 17, means are provided for progressively interrupting and retarding the flow of the charge and dividing the same into thin streams. This means comprises spaced refractory members or bricks 20 that are built into the apparatus and extend transversely across the inner wall of the calcining chamber to interrupt the flow of the material as it flows therethrough. These bricks are uniformly spaced in longitudinally and vertically disposed rows, the blocks of each horizontal row being off-set relative to the bricks of the adjacent upper and lower rows so as to continuously interrupt and divide the material into thin streams as it passes through the calcining chamber.

The carbonaceous material to be treated, such as limestone or the like, is delivered by the spout 21 into a hopper 22 which has a discharge opening 23 for delivering the material to the calcining chamber 17. A slidable gate valve 24 controls the flow of the charge from the hopper to the calcining chamber.

The furnace 14 is spaced from the adjacent furnace 15 by a refractory wall 25 and the furnace 16 is spaced from the furnace 15 by a similarly formed wall 26 (Figure 2), each of these walls extends the length and width of the apparatus so as to constitute one side of the preheating chamber 18, the calcining chamber 17 and the soaking pit 19. The wall 25 adjacent the calcining chamber 17 has a heating passage 27 in which are positioned a series of vertically spaced electric heating units 28. Each of these units consists of a resistance grid 29 (Figure 3) connected by the leads 30 to any suitable source of current or control apparatus to regulate the temperature in the heating chamber 27. One of the end walls such as 31 may have a removable portion or block 32 to permit removal or insertion of the units 28.

While any suitable electrical heating means may be employed for treating the circulating gas as it passes through the heating chamber 27, I prefer to use an electrical heating unit which will be inert to the circulating gas brought into contact therewith so as to have no deleterious effects on the gas; for example, a unit composed of nichrome metal or the like.

Each of the walls 25 and 26 adjacent the upper horizontal row 33 of the interrupting members 20 has a pair of spaced passages or conduits 34 and 35 (Figure 2). The passage 34 communicates with the calcining chamber through a series of inclined ports 36 which extend from beneath each of the interrupting members of the upper horizontal row 33. A suction fan or pump 37 operated by a motor 38 communicates through the pipe 39 with the passage 34 and through the pipe 40 with the passage 35 so that upon the operation of the fan, a portion of the evolved gas in the calcining chamber 17 is drawn through each of the passages 36 to the conduit 34 and is carried by the pipe 39 through the fan and discharged by the pipe 40 into the passage 35. From the passage 35 the gas is forced downwardly into the heating chamber 27 through a passage 41 so as to be brought into intimate contact with the heating units 28. The heated gas is withdrawn from the bottom of the chamber 27 through a series of ports 42 which communicate with the calcining chamber at points below the interrupting members. The evolved gas as it passes downwardly through the heating chamber 27 has its temperature raised by the heating units 28 to about 2000° F. and is introduced into the lower portion of the calcining chamber at this temperature so as to pass upwardly therethrough in a direction counter to that of the material. It will be seen that as the material gravitates through the calcining chamber it is continuously sub-divided into thin streams by the interrupting members 20, and at the same time, it is brought into intimate contact with the heated gas so as to effect rapid calcination of the material.

When there is maintained an atmosphere containing a high percentage of $CO_2$, unless the treated material or lime as it is deposited from the calcining chamber 17 into the soaking pit 19 is maintained at a temperature in excess of 1600° F., there is danger that the calcined lime will rapidly recarbonate. Introduction of air is objectionable due to the difficulty in separating the air from $CO_2$. Instead of maintaining the calcining chamber and soaking pit under subatmospheric pressure, I have found that the same effect may be efficiently and economically accomplished by introducing a heated gaseous fluid into the calcining chamber and soaking pit at a sufficiently high temperature; this will reduce the partial pressure of the carbon dioxide gas therein and avoid any objectionable recarbonization at temperatures above 900° F.

Accordingly, a gaseous fluid such as steam is discharged into the soaking pit through a pipe 43 having spaced connections 44 and 44' which extend transversely into the apparatus and provided with a series of openings 43' arranged on the underside of the connection for insuring a uniform distribution of the steam through the calcined material. Positioned between the pipes 44 and 44' is a slidable plate feeder 45 which has spaced openings 46 arranged to coact with fixed inclined members 47 for controlling the discharge of the treated material or lime from the upper portion of the soaking pit 19 to the discharge tank 48 in the lower portion of the soaking pit. The steam may be introduced into the soaking pit through both of the branched pipes 44 and 44' or selectively through either one of these pipes. The feeder 45 may be operated by a lever 49 pivoted as at 49' to the outside of the apparatus. The lower surface 50 of each of the members 47 is inclined relative to the feeder 45 to provide a passage 51 which, when the feeder 45 is in its closed position as shown in Figure 1, permits the steam to pass upwardly through the openings 46 but precludes the material from being discharged into the tank 48 until the feeder 45 is actuated so as to move the openings 46 away from the members 47. When actuating the feeder 45 to permit the discharge of the material into the tank 48, the movement of the feeder 45 relative to the members 47 acts to compress the material and force it through the openings 46.

The steam is constantly introduced into the soaking pit 19 preferably at a temperature in excess of 900° F. and under sufficient pressure to force upwardly any carbon dioxide gas that may find its way into the soaking pit. Consequently, there is maintained in the soaking pit both above and below the feeder 45 an atmosphere of dry steam. As the steam ascends into the calcining chamber 17 it mixes with the circulating heated gas therein, thus reducing the partial pressure of the gas and providing the effect of a partial vacuum in the calcining chamber. The steam thus prevents the evolved or occluded gas from clinging to the material during the calcining operation. In other words, the steam causes the gas to become less dense or rarified, thereby facilitating liberation of the evolved carbon dioxide from the material.

Since an atmosphere of dry steam is constantly maintained in the soaking pit 19, and since the circulating gas passing through the calcining chamber 17 is raised by the heaters 28 to a temperature of over 2000° F. the dry steam in passing through the calcined lime in the soaking pit 19 will act to cool the lime, while the lime in turn will super-heat the steam, so that there will be no actual loss in temperature in the calcining chamber 17. Additionally, the heat of the lime will not be dissipated but will tend to raise the temperature of the steam. Should the temperature of the lime at any point in the soaking pit 19 fall below 1600° F., the atmosphere of the dry steam will prevent recarbonization of the lime.

The lower portion of the wall 25 adjacent the tank 48 may be provided with heating units 52 to maintain the discharge tank 48 at a temperature above 900° F. at all times. These auxiliary units 52 are especially useful when starting the apparatus and may be required during operation to compensate for slight radiation losses or the lowering of the temperature in the tank 48. Moreover, by providing means for insuring an atmosphere of dry steam in all portions of the soaking pit, the lime is prevented from combining with the steam. Consequently, the atmosphere of the soaking pit is maintained at such a temperature that the lime will neither recarbonate nor hydrate.

As the dry steam in the soaking pit 19 ascends, it mixes with the circulating heated gas introduced into the calcining chamber through the openings 42 from the heating chamber 27 and is brought into intimate contact with the material as the latter is interrupted and divided into thin streams by the blocks or bricks 20 during its passage through the reducing chamber. A portion of the steam is carried with the circulating gas through the openings 36 and conduit 34 so as to be conducted to the heating passage 27 and returned to the calcining chamber at a sufficiently high temperature to effect rapid calcination of the material. The remaining portion of the steam ascends into the preheating chamber 18 where it is condensed and withdrawn from the apparatus in a manner as will subsequently be described.

Positioned in the preheating chamber 18 adjacent the discharge nozzle 23 is a tray or plate 53 provided with upwardly extending tubular flange members or nipples 54 which form openings 55 that are restricted at their upper ends as at 56 and through which the evolved gas and steam in the lower portion of the preheating chamber 18 pass. Surrounding the receiving hopper 22 is an insulated wall 57 which is spaced therefrom to form a passage 58. A suction fan 59 operated by motor 60 communicates with the interior of the preheating chamber through a pipe 61 so as to withdraw the evolved pure carbon dioxide gas from the apparatus and convey it to a suitable storage tank or the like, not shown. It will be seen that the raw stone or other carbonaceous material which is introduced into the hopper 22 through the pipe 21 is preheated by the gas and steam as the latter is drawn upwardly through the passage 58 and contacts with the outer surface of the hopper 22.

The mixture of heated gas and steam in the lower portion of the preheating chamber 18 as it ascends, gradually cools, and passes through the openings 55 at a temperature of about 300° F. to preheat the material in the hopper 22. Before the heated mixture reaches the pipe 61, its temperature may fall below 212° F. and may cause some of the steam to condense. Any water of condensation is collected in the tray 53 and withdrawn therefrom through the discharge pipe 62 which maintains the level of the water in the tray at a uniform depth. The evolved gas upon being separated from the steam is conducted upwardly through the passage 58 and withdrawn by the suction of the fan 59 through the pipe 61 to the storage tank. As the steam readily condenses with reduction in temperature, it is quickly disassociated from the carbon dioxide gas and allows the gas to be withdrawn in substantially pure form. Moreover, when the steam condenses, it carries with it any hydrogen sulphide which may be formed during calcination by the steam combining with any pyrites contained in the carbonaceous material or limestone being treated. The steam also removes from the gas any fine dust which may be produced by the lime and picked up during the circulation of the gas. It will therefore be seen that the calcining chamber 17 as well as the heating chamber 27 are maintained in an atmosphere inert to the circulating gas and the evolved gas is withdrawn from the apparatus in substantially pure condition.

In operation, the carbonaceous material to be treated such as limestone or the like, is introduced into the hopper 22 through the spout 21. The valve 24 is closed to retain the material in the hopper in order that the same may be preheated prior to its introduction into the calcining chamber. The preheated material as it falls on the upper horizontal row 33 of the interrupting members 20 is separated into thin streams and falls on the adjacent off-set blocks so as to be continuously sub-divided into further thin streams as it passes through the calcining chamber, thus insuring the particles being brought into intimate contact with the heated gas and steam passing upwardly through the apparatus. The steam is introduced into the soaking pit 19 at a sufficiently high temperature, e. g. 900° F., to create an atmosphere of dry steam in the soaking pit instead of an atmosphere of pure carbon dioxide gas. This dry steam also produces the effect of a vacuum in the calcining chamber 17 by reducing the partial pressure of the carbon dioxide gas and thus, by causing the gas to stretch or expand as it contacts with the material, facilitates liberation of the occluded gas and prevents the latter from adhering to the material. In other words, while neither the calcining chamber or the soaking pit are maintained at sub-atmospheric or negative pressure, the reducing of the partial pressure of the gas by the dry steam produces the effect of a sub-atmospheric pressure, since it rarifies the gas surrounding the material and allows the free liberation of the evolved gas.

The fan 37 causes a portion of the gas and steam in the calcining chamber 17 to be drawn through the openings 33 adjacent the upper horizontal row of blocks 36 and be conveyed by the conduit 34, pipe 39, pipe 40 and conduit 35 to the heating chamber 27. This mixture of heated gas and steam as it passes downwardly through the heating chamber is brought into intimate contact with the heating units 28 and returned to the calcining chamber through the ports 42 at a sufficiently high temperature, e. g., above 2000° F. to effect rapid calcination of the material as the latter passes through the calcining chamber in a direction counter to that of the heated gas and steam.

The treated material or lime after passing the interrupting members 20 falls into the soaking pit 19 where it is retained for a predetermined period by reason of the fact that the plate feeder 45 has been previously moved to its closed position. The material is allowed to build up in the soaking pit above the feeder 45 while the members 47 permit the steam as it issues from the passage 43 to pass upwardly through the openings 46 and passage 51 to create an atmosphere of dry steam in the soaking pit. The pressure of the steam tends to force the carbon dioxide gas upwardly and reduce the partial pressure of the gas in the calcining chamber 17. The treated material or lime deposited in the soaking pit 19 has its temperature reduced from 2000° F. to about 1600° F. However, as the soaking pit 19 is maintained in an atmosphere of dry steam having a temperature in excess of 900° F., it will be seen that the steam passing upwardly through the calcined lime into the soaking pit 19 cools the lime, and the lime in turn super-heats the steam so that there is no appreciable loss in temperature in the calcining chamber 17. Moreover, the heat of the lime, instead of being dissipated, is reclaimed to elevate the temperature of the steam. Should the temperature of the lime in the soaking pit 19 fall below 1600° F., the atmosphere of dry steam therein will prevent recarbonization of the lime.

In the initial operation of the apparatus, the charge in the hopper 22 is introduced into the calcining chamber 17 by the opening of the valve 24. This valve is then closed and a new charge introduced into the hopper 22. The plate feeder 45 is also moved to its closed position and the steam is introduced into the soaking pit so as to maintain an atmosphere of dry steam therein. The amount of time required and the duration the material is exposed to the heat varies depending upon the character of the material being treated. When Bellefonte limestone, known as Trenton Ledge, is being treated, and it is desired to liberate the evolved carbon dioxide gas in substantially pure form, the electrical heating units 28 in the heating chamber 27 are regulated or set to produce a temperature of approximately 2000° F. which is sufficient to effect complete calcination of the charge. The method of treating the carbonaceous material is continuous and one charge of the limestone introduced from the hopper 22 into the calcining chamber may be operated for twenty-four hours without recharging the same or the discharging of the treated material from the apparatus. When discharging the lime at the end of the treated period, the valve 64 is opened so that the treated material in the tank 48 may be withdrawn. This valve is then closed and the valve feeder 45 opened to discharge the material in the soaking pit 19 into the tank 48.

While I have shown the various valves to be manually operable, it will be understood that automatic means may be employed for actuating these parts at predetermined intervals during the operation of the apparatus.

The auxiliary heaters 52 adjacent the tank 48 facilitate the initial operation of the apparatus and also act to supply slight radiation losses and maintain a temperature above 900° F. in the tank 48 to prevent the calcined lime combining with the steam and forming hydroxide.

The suction fan 59 continuously draws a portion of the evolved gas and steam in the calcining chamber through the openings 55 in the tray 53. The gas and steam passes around the hopper 22 at a temperature of about 300° F. and as this temperature is quickly reduced by the raw cool material in the hopper 22, the steam readily condenses, leaving the carbon dioxide gas in pure form. This pure gas is then withdrawn from the apparatus through the pipe 61 and conveyed to a suitable storage tank or the like. The water of condensation collects in the tray 53 and is drawn off through the pipe 62. When the steam condenses it will carry with it any fine dust which may be produced by the lime and picked up by the circulating gas and will also remove from the carbon dioxide any hydrogen sulphide which may be formed during calcination by the steam combining with any pyrites contained in the limestone or carbonaceous material being treated.

As diagrammatically illustrated in Figure 4, the interrupting members 20 of each horizontal row are horizontally off-set relative to the members immediately above and below the same so that as the material 66 passes between the members of each horizontal row, it will pile up on the interrupting members immediately below and be divided into thin streams which extend from opposite sides of each of the lower interrupting members. In other words, the spaces between adjacent horizontal rows of the interrupting members 20 are filled by substantially triangular-form heaps of material between which the heated gas and steam circulates so as to be brought into intimate contact with the material during the calcining operation. As the material builds up in a pyramidal heap on each block 20, it forms gas pockets 67 of pyramidal shape beneath each of the interrupting members. The formation of these pockets tends to insure the thorough heating of the material and also permits the ready removal of a portion of the evolved pure gas and steam through the passages or openings 36 adjacent the upper horizontal row 33, so that the gas and steam may be circulated through the heating chamber 27 and be returned to the calcining chamber 17 at a sufficiently high temperature to effect rapid and thorough calcination of the material.

The lining of the calcining chamber 17 is preferably provided with a series of vertically disposed uniformly spaced projections 65' between which are alternately positioned horizontal rows of interrupting members 20 to insure the uniform circulation of the heated gas and steam through the calcining chamber and thus prevent certain areas being subjected to different temperatures than others during the calcining operation. These projections coact with the adjacent interrupting members 20 to deflect the heated gas and steam as the mixture passes upwardly through the calcining chamber to uniformly distribute the treated mixture therethrough.

In the modified form of the invention shown in Figures 5, 6 and 7, the material is treated in substantially the same manner as previously described. However, instead of positioning the feeder between the steam inlet pipes, these parts are combined in a unitary structure. As shown, there is positioned in the soaking pit 68 a transversely disposed revoluble shaft 69 on which is keyed a feeder 70 so as to rotate with the shaft. One end of the shaft 69 extends through a bushing 71 and is maintained in position by a packing gland 72. The opposite end portion of the shaft 69 extends through a bushing 71 and is maintained in position by a packing gland 72. The opposite end portion of the shaft 69 extends through a similarly formed bushing 71 and a gland 72 and has keyed thereto a sprocket wheel 73 arranged to be engaged by a drive chain 74 to effect rotation of the shaft and feeder at predetermined intervals during the operation of the apparatus. A fixed coupling 75 extends into the hub of the sprocket 73 to rotatably receive the adjacent end of the shaft 69. Steam at a temperature above 900° F. is conducted by the pipe 76 to the interior of the coupling 75 and is discharged from the shaft 69 through the spaced openings 77 to be introduced into the soaking pit 68 and the discharge tank 78 to create an atmosphere of dry steam therein. The feeder 70 has outwardly extending blades 79 arranged to successively pass a reduced elongated opening 80 in the soaking pit 68 for discharging the treated lime into the tank 78 at predetermined intervals during the operation of the apparatus. Each of the blades 79 is of substantially the same length as the opening 80, so that when the blades are rotated to discharge the material, each succeeding blade will be moved to a position medially of the opening 80 (Figure 6) and will coact with the blade which is being moved away from the opening to prevent the material escaping between the ends of the blades and the adjacent wall of the soaking pit. While I have shown the shaft 69 revoluble with the feeder 70, it is manifest that these parts may be arranged so that the shaft 69 is fixed and the feeder rotatable relative thereto.

In all forms of the invention shown, it will be observed that means are provided for maintaining an atmosphere of dry steam or the like in the apparatus at a point below the calcining chamber to prevent the treated material or lime from recarbonating due to the lowering of the temperature of the material. Additionally, the dry steam mixes with the circulating heated gas to reduce the partial pressure of the gas and thus facilitate the rapid liberation of the gas from the material. The steam is prevented from mixing with the lime by reason of the maintenance of a temperature in the lower portion of the apparatus which prevents hydration.

The temperatures employed for heating the material and preventing recarbonization are based upon the treatment of Bellefonte limestone which disassociates and recarbonizes at about 1600° F. Manifestly, these temperatures may vary depending upon the analysis and types of carbonaceous material being treated. In other words, in the treating of the material, the calcining chamber and the circulating heating medium are maintained at a sufficiently high temperature to effect rapid calcination of the charge while the soaking pit is maintained at a temperature above that at which recarbonization of the treated material or lime takes place.

Preferably, about 50% steam and 50% carbon dioxide gas are used in the circulating system. This percentage may be varied and when the percentage of steam is substantially in excess of that of the gas, the partial pressure of the gas is reduced to a point where the total pressure is increased so as to obviate the necessity of utilizing the suction fan 59 for withdrawing the mixture of gas and steam from the apparatus. Consequently, if the percentage of the steam is increased to say 80%, the increased total pressure would be sufficient to force the combined $CO_2$ gas and steam from the top of the kiln by its own pressure and thus dispense with the use of suction means or the like for drawing the mixed gas and steam from the apparatus.

It will be understood that the method and forms of the invention shown for recovering the gas in pure condition from carbonaceous material are merely illustrative and that such changes may be made as fall within the purview of one skilled in the art without departing from the spirit of the invention and the scope of the appended claims.

I claim:

1. The method of treating alkali-earth carbonate material which consists in passing the material in thin streams through a heated zone, and introducing dry steam into the heated zone so as to mix with the gas therein, said steam acting to reduce the partial pressure of the gas and thus facilitate the liberation of the gas from the material.

2. The method of treating alkali-earth carbonate material which consists in passing the material in a stream through a heated zone, separating the material into thin streams as it passes through the heated zone, withdrawing the evolved gas, heating the withdrawn gas and returning the same to the heated zone and passing it therethrough in a direction counter to the flow of the material, and introducing dry steam at a temperature above 900° F. into the heated zone to reduce the partial pressure of the gas whereby to facilitate the liberation of the gas.

3. The method of treating alkali-earth carbonate material which consists in passing the material in a stream through a heated zone, separating the material into thin streams as it passes through the heated zone to thoroughly subject the material to the heat therein, withdrawing the evolved gas, electrically heating some of the withdrawn gas and returning the same to the heated zone and passing it therethrough in a direction counter to the flow of the material, and introducing dry steam into the heated zone to mix with the gas to reduce the partial pressure of the gas, thereby facilitating the liberation of the gas.

4. The method of treating alkali-earth carbonate material which consists in passing material in a stream through a heated zone having an atmosphere inert to the evolved gas, separating the material into thin streams as it passes through the heated zone to thoroughly subject the material to the heat therein, withdrawing the evolved gas, electrically heating some of the withdrawn gas and returning the same to the heated zone and passing it therethrough in a direction counter to the flow of the material, and introducing dry steam into the heated zone to mix with the circulating gas and facilitate the liberation of the gas.

5. The method of treating alkali-earth carbonate material to obtain substantially pure carbon dioxide, which consists in passing the material through a calcining zone having an atmosphere inert to the evolved gas, separating the material as it passes through the heated zone by progressively interrupting the flow of the material to sub-divide the same into thin streams, electrically heating the evolved carbon dioxide gas, circulating the heated gas through the calcining zone in a direction counter to the flow of the material, introducing dry steam into the calcining zone so as to mix with the gas and reduce the partial pressure of the gas.

6. Apparatus for treating alkali-earth carbonate material comprising a reducing chamber, means for causing material to travel in a thin stream through said chamber, said chamber being confined whereby to exclude air therefrom, means for electrically heating carbon dioxide gas exterior to said chamber and for circulating the same through the chamber to contact with the material, means for introducing dry steam into the chamber and means for withdrawing evolved carbon dioxide.

7. Apparatus for treating alkali-earth carbonate material comprising a reducing chamber, means for causing material to travel in a thin stream through said chamber, said chamber being confined whereby to exclude air therefrom, means for electrically heating carbon dioxide gas exterior to said chamber and for circulating the same through the chamber to contact with the material, means below said chamber for collecting the material which has travelled through said chamber, means for maintaining in said chamber and around the collected material an atmosphere of dry steam whereby to reduce the partial pressure of the evolved carbon dioxide, and means for withdrawing evolved carbon dioxide.

8. An apparatus for treating alkali-earth carbonate material including a calcining chamber, a soaking pit beneath said calcining chamber and communicating therewith, means for separating the material into thin streams as it passes through the calcining chamber, means for heating the material in the calcining chamber, means for introducing dry steam into the calcining chamber to reduce the partial pressure of the gas and facilitate the liberation of the evolved gas from the material, a preheating chamber positioned above said calcining chamber, a feed hopper within said preheating chamber and spaced from the side walls thereof, means for withdrawing the evolved gas and steam from the calcining chamber into the preheating chamber to heat the material in said hopper, and means for separating the evolved gas from the steam prior to the withdrawal of the gas from the apparatus.

9. An apparatus for treating alkali-earth carbonate material including a calcining chamber, a soaking pit communicating with the calcining chamber for receiving the treated material, an electrically heated chamber communicating with said calcining chamber at its upper and lower ends, means in said calcining chamber for separating the material into thin streams as it passes therethrough, means for introducing dry steam into the soaking pit, means for withdrawing the evolved gas and steam from the calcining chamber and conducting the mixture to the electrically heated chamber so as to discharge into the lower portion of the calcining chamber, and means for maintaining an atmosphere of dry steam in the soaking pit to prevent recarbonation of the calcined material, said dry steam acting to reduce the partial pressure of the evolved gas to prevent the same from clinging to the material during the calcining operation.

10. An apparatus for treating alkali-earth carbonate material including a reducing chamber, heated means for calcining the material as it passes through the reducing chamber, a soaking pit for receiving the calcinated material as it issues from the reducing chamber, a discharge tank beneath said soaking pit, a valve for controlling the flow of the treated material to the discharge tank, and means for introducing dry steam into the soaking pit and the discharge tank so as to contact with the material irrespective of the position of the valve.

11. An apparatus for treating alkali-earth carbonate material including a reducing chamber, heated means for calcining the material as it passes through the reducing chamber, a soaking pit for receiving the calcinated material as it issues from the reducing chamber, a discharge tank beneath said soaking pit, a slidable valve for controlling the flow of the treated material to the discharge tank, and means associated with the valve for permitting the introduction of dry steam into the soaking pit and the discharge tank through the valve irrespective of the position of the latter.

ROBERT S. WALKER.